United States Patent [19]

Hass et al.

[11] 3,987,664
[45] Oct. 26, 1976

[54] DRY-TESTING SYSTEM FOR DETECTING LEAKS IN CONTAINERS

[75] Inventors: Hyman Hass, Stamford, Conn.; Terrence P. Murphy, Hempstead, N.Y.

[73] Assignee: Applied Fluidics, Inc., Westbury, N.Y.

[22] Filed: Dec. 16, 1975

[21] Appl. No.: 641,296

[52] U.S. Cl. .................................. 73/49.2; 73/49.8
[51] Int. Cl.² ........................................ G01M 3/32
[58] Field of Search .................. 73/49.8, 49.3, 49.2, 73/40

[56] References Cited
UNITED STATES PATENTS

| | | | |
|---|---|---|---|
| 2,880,610 | 4/1959 | McCoy | 73/49.2 |
| 3,490,269 | 1/1970 | Hinderer | 73/49.2 |

FOREIGN PATENTS OR APPLICATIONS

| | | | |
|---|---|---|---|
| 1,273,379 | 5/1972 | United Kingdom | 73/49.3 |

*Primary Examiner*—S. Clement Swisher

[57] ABSTRACT

A leak detection system capable of efficiently dry-testing containers such as steel drums of large capacity. The system includes a test station constituted by a hermetically-sealed chamber adapted to receive a container to be tested and provided with a retractable head coupled to an external fill assembly. The head functions to sealably engage the bung hole or other container opening and to fill the container with pressurized air, the pressure within the container being maintained during the test period at a constant level, whereby physical distortion of the container is controlled. The pressure within the test chamber is sensed and the output of the sensor is applied to a data processor wherein the influence of temperature on the test chamber pressure is discounted by means of a waveform scanning technique, making it possible to determine the extent to which the container under test is heated and to predict the error pressure in the chamber due to thermal effects. The data processor yields an output signal indicative of the container condition and independent of thermal effects.

17 Claims, 7 Drawing Figures

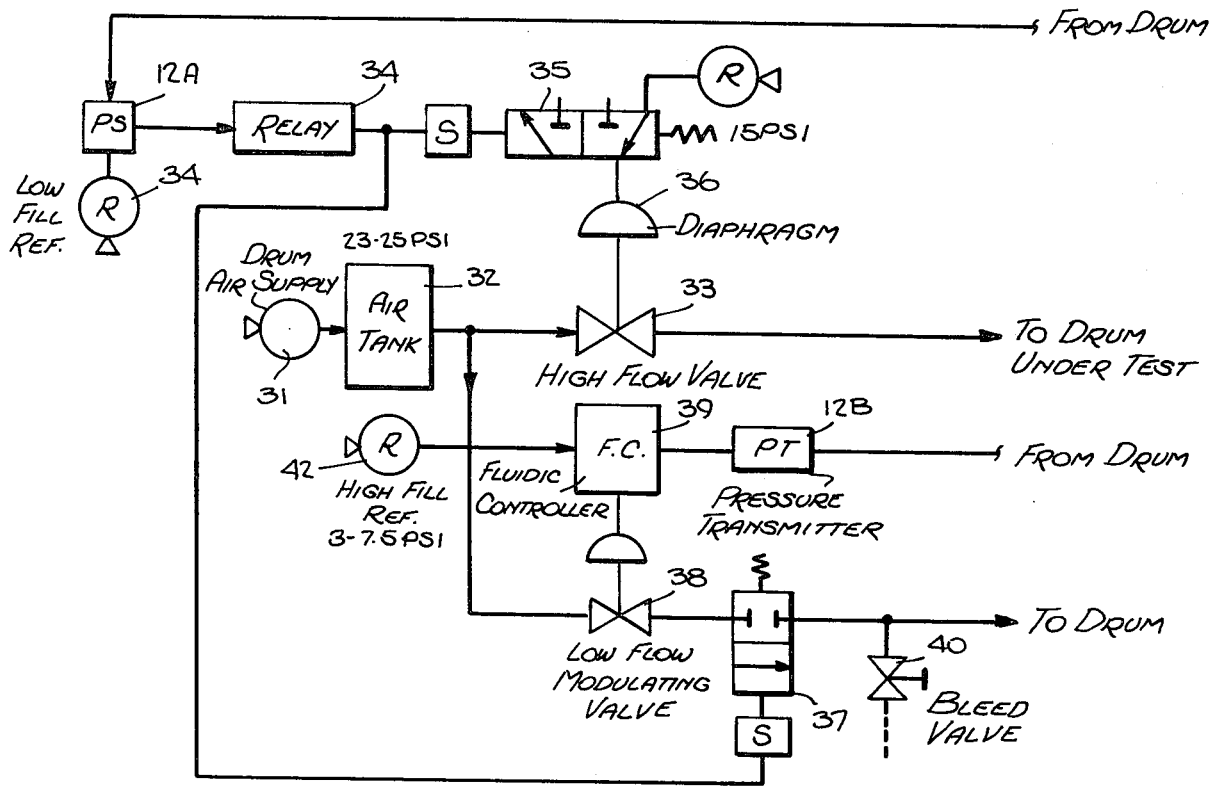
Fig. 4.
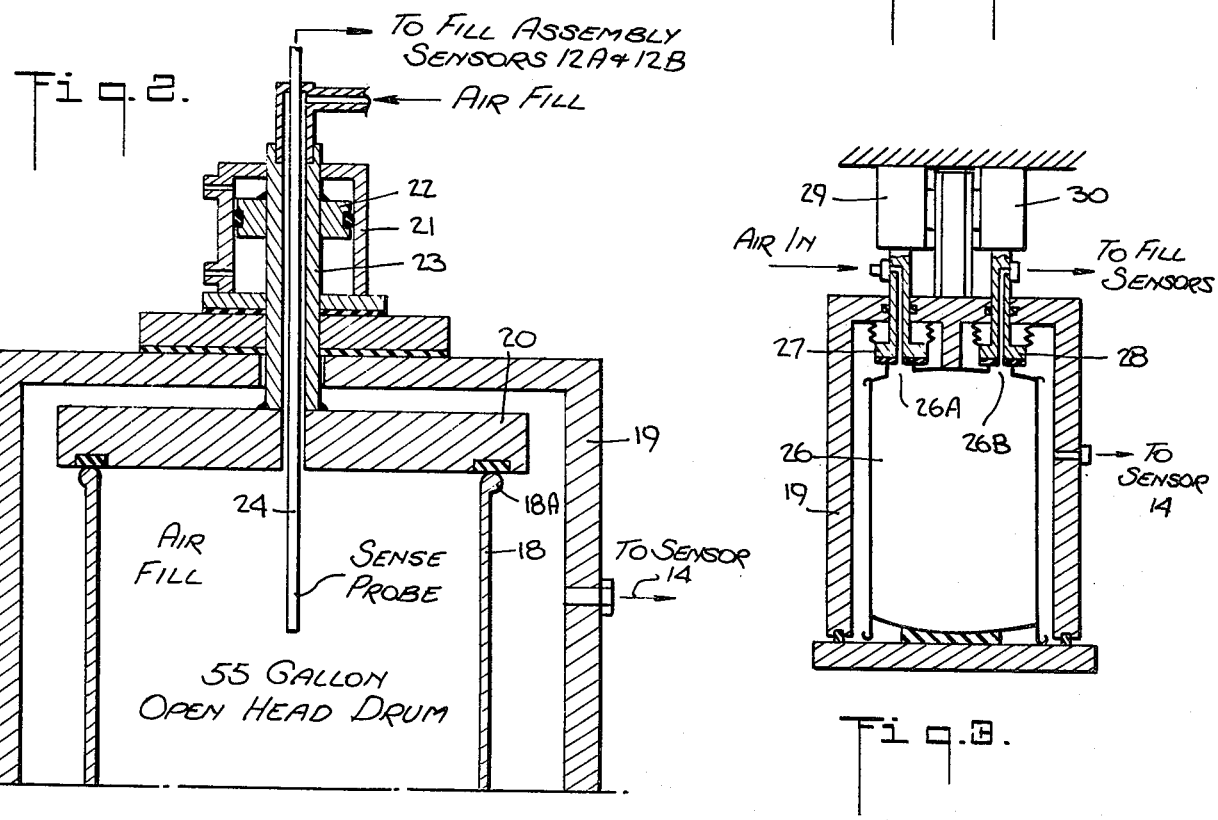
Fig. 2.
Fig. 3.

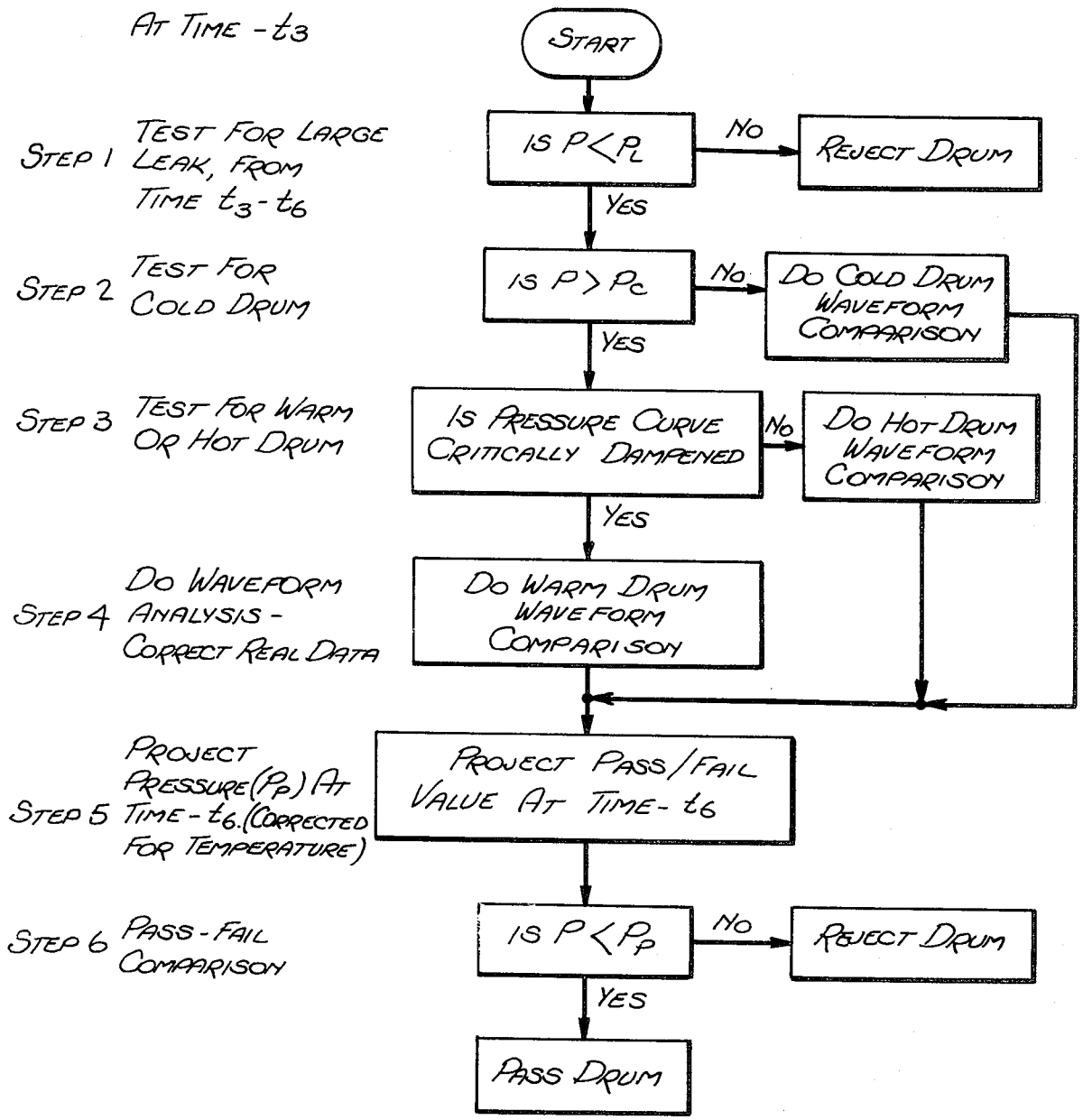

DRY-TESTING SYSTEM FOR DETECTING LEAKS IN CONTAINERS

BACKGROUND OF THE INVENTION

This invention relates generally to leak detection systems for testing containers, and more particularly to a system in which the integrity of a container is dry-tested in a closed chamber.

In testing steel drums, large plastic or metal receptacles or other large containers, existing techniques generally involve a wet test procedure. Thus the common practice is to first close the container and then submerge the closed container in a water tank to see if bubbles emerge therefrom, thereby indicating the presence of a leak. Another practical approach is to close and pressurize the container and to thereafter spray a soap solution thereover, soap bubbles being generated on the surface of the container should there be a leak therein.

Whether the wet test is conducted under water or by means of soap bubbles, in either case careful visual observation is required to find leaks. A gross leak will be immediately apparent, but a minute fissure, which nevertheless renders the container unacceptable, calls for more careful scrutiny. The practical drawback in wet testing containers is that the human observer, after an hour or more of tedious testing on a production line basis, may become fatigued, bored or inattentive, and may fail in some instances to note the presence of small bubbles indicative of a leak.

Moreover, because present production rates for large (55-gallon) steel containers are one drum per six seconds, the human operator is unable to observe or test the ends of the drum which are clamped and obscured, or to see the chime seams around the drum, for the drums are held in only one position. Accordingly, many leaks escape the view of even the diligent human observer when wet testing on a production line basis.

Also known are so-called dry testing techniques wherein the drum or container is placed within a test chamber which is hermetically sealed, after which the drum is pressurized with air through its bung hole. No air from the interior of the pressurized drum can flow into the test chamber unless there is a leak in the drum, the existence of this leak being determined by sensing the pressure within the test chamber. Should no leak exist, the test chamber will remain at its normal pressure level, but if there is a leak, then the chamber pressure will rise above the normal level because of the transfer of pressurized air from the interior of the container to the chamber interior.

The difficulty with this known dry testing technique and the reason why it is especially inadequate in checking large containers is that leakage from the pressurized container into the test chamber is by no means the only factor giving rise to an increase in chamber pressure, for several other factors come into play.

Thus should the dry tester be zero set at a given chamber atmospheric temperature, a fall in temperature within the chamber may cause a leaking container to improperly pass the leak test. Though the leak produces a rise in test chamber pressure, a temperature drop in the atmosphere within the chamber reduces this pressure and the resultant pressure reading will therefore not reflect the leak. On the other hand, a rise in the temperature of the chamber atmosphere may cause good containers to appear leaky, particularly since the influence of a small change in temperature on the test chamber pressure is much larger than the effect of a small leak. Hence with existing dry testing systems, thermal effects act to totally mask small leaks.

Furthermore, a change in pressure within the test chamber will also result from a change in its operating volume. The operating volume of the test chamber is determined by the overall volume of the chamber minus the volume of the container therein under test. The test chamber itself is designed to be extremely rigid, hence its overall volume is constant, but the containers being tested are not rigid and, when pressurized, these containers "breathe" or change in volume with even the minutest change in internal pressure. Thus the pressure in the test chamber may reflect a change in the operating volume of the chamber rather than a leak in the container under test.

An additional problem is the influence of the air supply from the compressor feeding air into the drum being tested. This air varies in temperature which, in turn, changes the size of the drum as it is heated during a compression cycle or cooled by the varying temperature of the compressed air. One must also take into account the varying temperature in any typical production plant such as cold mornings, and radiation during warm afternoons which tend to heat up the test chamber and cause thermal effects that interfere with the detection of small leaks.

Moreover, the steel drums to be tested can vary in temperature from cold to very hot; these varying temperature conditions resulting from the design of the production line, by the seaming operations, by baking ovens, and by stoppages in the production line which tend to cool otherwise heated drums. As a consequence, the drums arrive at the test chamber at temperatures that vary tremendously.

Still another complication that has militated against the success of dry-testing systems of the type heretofore known is that large steel containers are not uniformly fabricated of the same gauge steel and, depending on the changing gauge, successive containers will vary in their physical growth and distortion rates under pressure during test.

The problems outlined above which are involved in testing containers become aggravated with an increase in container size. Thus for steel drums which are usually manufactured in capacities ranging from 1 to 55 gallons, the greatest difficulties are encountered in testing 55-gallon containers.

Or to express this relationship in positive terms, any dry-testing system capable of adequately testing 55-gallon containers will also be capable of testing smaller containers more efficiently and more accurately. But the fact remains that no dry-testing system of the type heretofore known has been capable of satisfactorily testing 55-gallon containers for leaks.

SUMMARY OF INVENTION

In view of the foregoing, the main object of this invention is to provide a leak detection system capable of accurately and efficiently dry-testing containers on a production line basis.

More particularly, it is an object of this invention to provide a dry-testing system in which a container under test is subjected to internal pressure within a hermetically-sealed chamber, whereby a pressure rise sensed within the chamber as a result of flow therein from the pressurized container is indicative of a leak, the system being adapted to discriminate between a pressure rise due to a leak and all other factors, including a pressure rise due to thermal effects.

A significant advantage of the invention resides in the fact that the system is capable of detecting leaks in 55-gallon drums in the range of 1 to 50 cc's per minute. Since this capability, as pointed out previously, represents the worst case in which the problem of discrimination between the effect of a leak and all other factors which cause a change in test chamber pressure is most severe, the system is therefore capable of accurately and efficiently testing drums and other forms of containers whose capacities are less than 55 gallons.

Also an object of this invention is to provide a dry test system of the above type in which the effects of a breathing drum on the volume of the test chamber are nullified by means of a fill assembly that rapidly fills the drum under test to accommodate high speed production and thereafter governs the internal pressure of the drum so that the drum dimensions remain constant during the leak test procedure.

Still another object of this invention is to provide a dry test system of the above type in which the effects of all thermal changes on chamber pressure are discriminated against by a waveform scanning technique, making it possible to determine the temperature condition of the drum under test throughout the usual drum temperature spectrum and to predict the error pressure that will be produced in the test chamber by the drum being tested, at a given point in time, as a result of its temperature condition, whereby the error pressure may be subtracted from the test chamber pressure reading to determine the pressure due to a leak independently of all other factors.

Briefly stated, these objects are attained in a leak detection system that includes a test station constituted by a hermetically-sealed chamber adapted to receive a container to be tested and provided with a retractable head coupled to an external fill assembly. The head functions to sealably engage the bung hole or other container opening and to fill the container with pressurized air, the pressure within the container being carefully regulated during the test period to maintain a constant level, whereby physical distortion of the container during the test period is prevented.

The pressure within the test chamber is sensed and the output of the sensor is applied to a data processor wherein the influence of temperature on the test chamber pressure is discounted by means of a waveform scanning technique, making it possible to determine the extent to which the container under test is heated and to predict the error pressure in the chamber due to thermal effects. The data processor yields an output indicative of the container condition and independent of thermal effects, which output may be used to operate an accept/reject mechanism to pass only containers which are free of leaks.

OUTLINE OF DRAWINGS

For a better understanding of the invention as well as other objects and further features thereof, reference is made to the following detailed description to be read in conjunction with the accompanying drawings, wherein:

FIG. 1 is a block diagram of a leak detection system in accordance with the invention for dry-testing containers;

FIG. 2 schematically shows the test station arrangement for testing open-head drums;

FIG. 3 schematically shows the test station arrangement for testing closed-head drums;

FIG. 4 illustrates in block diagram the air-fill assembly for the leak detection system;

FIG. 7 is a flow diagram of the waveform analysis technique employed in the system.

DESCRIPTION OF INVENTION

The Problem

Before describing a system in accordance with the invention, we shall first demonstrate why in a dry-testing system in which a drum under test is pressurized within a chamber, the change in pressure within the chamber as a result of a leak is relatively slight as compared with a change in pressure arising from a change in temperature or a change in the volume of the drum, and that unless one can provide an indication which is representative only of the pressure change resulting from a leak, one cannot accurately test for leaks:

Assuming the following parameters:

| | | |
|---|---|---|
| Chamber Volume | ≈ | 46,000 cm³ |
| Leak Q | = | $\frac{37cc}{min} = \Delta Q - 7.4$ cc/12 sec |
| Drum O.D. | = | 23" |
| H T. | = | 34.625" |
| Chamber I.D. | = | 24.5' |
| H T. | = | 37" |

Let
$\Delta P$ = total change in chamber pressure
$P_A$ = 14.7 psia
$\Delta P_T$ = pressure change due to temperature
$\Delta P_Q$ = pressure change due to leak into chamber
$\Delta P_V$ = pressure change due to volume change in chamber because of breathing drum, then $$\left. \begin{array}{l} \Delta P_T = \frac{\Delta T}{T} \cdot P_A \\ \Delta P_Q = \frac{\Delta Q}{V} \cdot P_A \\ \Delta P_V = \frac{\Delta V}{V} \cdot P_A \end{array} \right\} \quad \Delta P = \left\{ \frac{\Delta T}{T} + \frac{\Delta Q}{V} + \frac{\Delta V}{V} \right\} P_A$$

$$\Delta P_Q = \frac{7.4}{460000} \times 14.7 = 0.0024 \text{ psi}$$

$$\left. \begin{array}{l} \Delta P_T = \frac{1°}{530} \times 14.7 = 0.0277 \text{ psi} \\ \Delta P_V = \frac{41}{46000} \times 147 = 0.0131 \text{ psi} \end{array} \right\} \quad \Delta P_T + \Delta P_V = 0.0408 \, p$$

$\Delta V = 41$ cc/0.001 inch change in drum diameter
$\Delta T = 1°$ F.

From the foregoing example, it will be evident that the pressure change $\Delta P_Q$ in the chamber due to a leak into the chamber is quite small compared to the pressure changes resulting from temperature and volume changes.

The General System

Figure 1:
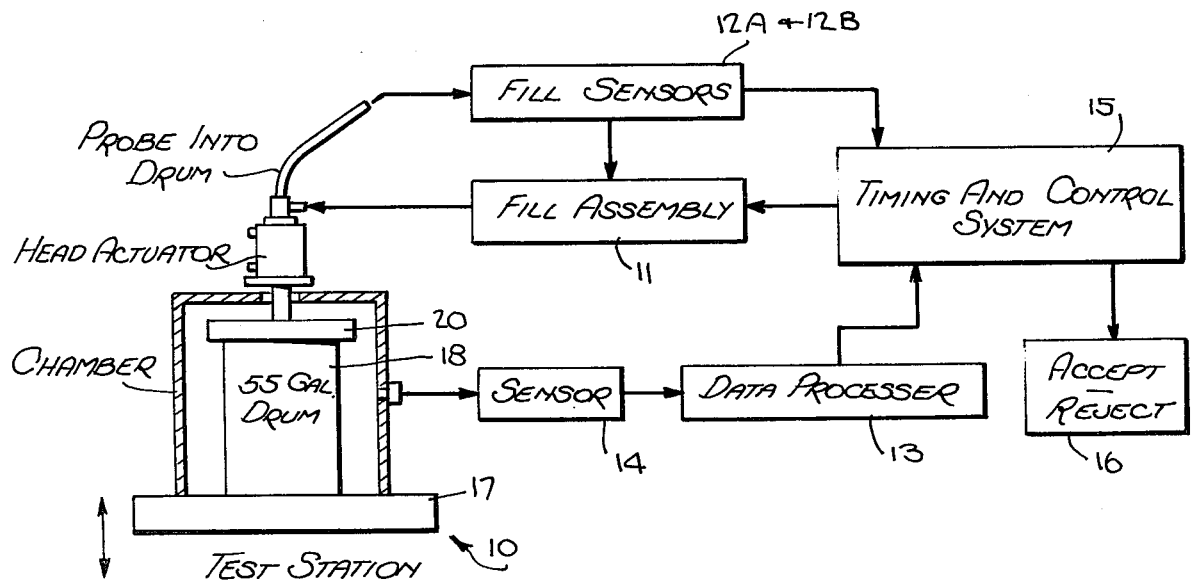

Referring now to FIG. 1, there is shown the main stages of a container leak detection system in accordance with the invention. The system comprises a test station, generally designated by numeral 10, an air-fill assembly 11 responsive to signals derived from fill sensors 12A and 12B operatively coupled to the container under test, the assembly supplying compressed air or other fluid to pressurize the container and for governing the pressure therein, a data processor 13 to analyze the signal derived from a sensor 14 operatively coupled to the test station chamber to determine the pressure therein, and a controller 15 for timing and coordinating all operations of the system. The controller provides an output signal which is applied to an accept/reject mechanism 16 which acts on the container after testing is completed and the container is returned to the production line to pass a container as acceptable or to reject it from the line as leaky.

While the system is disclosed as it operates to test one container at a time, it is to be understood that in practice the system may be arranged to test a group of containers in parallel or sequentially to suit production requirements.

Test station 10 is constituted by a retractable platen 17 which supports a drum 18 under test, the platen engaging the rim of an open stationary chamber 19. Suitable gasket means are provided to hermetically seal the chamber when it is enclosed by the base bearing the drum to be tested.

The Test Chamber

As shown in greater detail in FIG. 2, for testing an open drum 18 having a top chime 18A, chamber 19 at its upper end is provided with a retractable head 20 which is operated by a hydraulic head actuator 21 externally mounted on top of the chamber, the head sealably engaging chime 18A of the drum. Hydraulic actuator 21 is provided with a piston 22 whose hollow piston rod 23 is coupled to head 20. A sensing probe 24 extends coaxially through piston rod 23, the probe communicating with fill sensors 12A and 12B in the fill assembly. Hollow rod 23 is linked through inlet 25 to air-fill assembly 11, whereby when the head is in engagement with the drum, the drum may then be properly pressurized.

In the alternative test station arrangement shown in FIG. 3, container 26 under test is a closed-drum having bung holes 26A and 26B. In this instance, a pair of heads 27 and 28 is required to engage and seal these bung holes, the heads being operated by respective hydraulic actuators 29 and 30. In this case, the fill air is introduced through head 29 and the sensing probe is installed in the head 30, the test station operation in all other respects being the same as with an open drum.

The Air-Fill Assembly

As shown in FIG. 4, the air-fill assembly 11 is designed to pressurize an empty drum to a predetermined level and to then maintain this pressure level within very narrow limits (within thousandths of one psi). The assembly acts as a dual stage (High-Low) control system, one stage of which functions exclusively to carry out high volume fill operations at a rapid rate, the other stage thereafter acting to effect low volume fill regulation to maintain a stable drum pressure. The fill system makes use of a closed loop process control arrangement in which the process variable is the drum pressure, all set points and supply pressures being derived from precision regulators.

In the high volume stage of the fill assembly, the high volume fast fill function is accomplished by means of a regulated air supply 31 operating in conjunction with a receiver tank 32 whose output is fed through a high-flow valve 33 having a large orifice into the drum under test, the pressure in the receiver tank being closely regulated. This regulated tank pressure, the size of the orifice in flow valve 33 and the final fill pressure to be attained determines the rate of fill.

Pressure sensor 12A which is responsive to the pressure in the drum under test, monitors the pressure therein and compares it to a low-fill reference pressure source 34 to provide a suitable action when a predetermined low-fill pressure level is detected. When this low-fill reference pressure level is reached in the drum, the large orifice valve 33 is then automatically shut. This valve closure is effected by a relay 41 coupled to sensor 12 and activated when the low fill reference pressure is reached, the relay activation energizing a solenoid-operated valve 35, which in turn operates a diaphragm 36 functioning to close high-flow valve 33, thereby shutting off the flow of air from receiver tank 32 to the drum through valve 33. The inherent inertia of the fill fluid continues to raise the pressure within the drum temporarily.

When high flow valve 33 is caused to close by sensor 12A, it shuts off the high volume stage of the assembly, sensor 12A at the same time rendering the low-volume stage operative. This is accomplished by means of a solenoid-operated valve 37 which is responsive to the output of sensor 12A and is interposed between a diaphragm-operated, low-flow modulating valve 38 and the drum, such that when the low fill reference level is sensed, valve 37 is caused to open, thereby completing the flow path between receiver tank 32 and modulating valve 38 to the drum.

A fluidic process controller 39, such as the controller disclosed in Hass U.S. Pat. No. 3,528,444 (Sept. 15, 1970) acts in conjunction with modulating valve 38 and a fixed bleed valve 40 to govern the pressure in the drum so as to maintain the pressure therein at a stable level. The pressure in the drum, as picked up by the sensor probe, is applied as a pneumatic process variable signal by a differential pressure transmitter 12B to one input of fluidic controller 39, the other input being a set point derived from a high-fill reference pressure source 42. A suitable differential pressure transmitter is disclosed in U.S. Pat. No. 3,742,969.

The output of fluidic controller 39 is a fluidic error signal which depends on the deviation of the internal drum pressure from the high-fill reference or set point source, which error signal acts in the usual manner of a closed loop process control system to so modulate low flow valve 38 as to maintain a desired pressure level in the drum.

Because the dual stage fill assembly acts to fill the drum very rapidly to accommodate high speed production and then maintains the internal drum pressure very accurately within thousandths of a psi, the drum under test does not breathe and the operating volume of the test chamber is held at a constant value. Hence the change of pressure in the test chamber can only be due to a temperature change and/or to a flow therein from the drum under test because of a leak.

The Data Processor

Since the fill assembly stabilizes the pressure within the drum and nullifies the effects of a breathing drum, in order to obtain a reading from data processor 13 which represents only the pressure in the test chamber due to a leak, it is essential that the processor discriminate against the effects of temperature on chamber pressure, regardless of the source of the temperature change. For this purpose, the processor uses a waveform scanning technique making it possible repeatedly and accurately to decide whether the drum under test is cold, warm or hot or at a temperature which is at any intermediate value.

In order accurately to carry out the necessary waveform analysis, one must know in advance the shape and amplitude the waveforms will assume for the entire thermal spectrum, which in this case is the spectrum whose lowest end is a cold drum and at whose highest end is a hot drum, the values therebetween being progressively rising temperature levels. By a "cold drum" is meant a drum whose temperature has the lowest anticipated value in the context of the production line for which the tester is intended, and by a "hot drum" is meant a drum whose temperature has the highest anticipated value.

These waveforms result from the operation of the fill assembly, the closed loop process control incorporated in this assembly being adjusted so that one always sees a damped pressure curve. That is to say, when the sensed internal drum pressure deviates from the predetermined set point, the process control system proceeds to reduce this deviation and causes the process variable, which is the sensed internal drum pressure, to swing back and forth about the set point in a damped oscillatory pattern until the process variable lies at the set point. As shown by the curves in FIG. 5, the internal pressure in the drum under test is plotted against time, curve C representing the resultant waveform of a cold drum, curve W the waveform of a warm drum, and curve H the waveform for a hot drum. In the temperature range from cold to warm, the curves are always critically damped, and a variation in temperature results in a change in the amplitude of the waveform. In the context of the present system, a hot drum is a drum that exhibits an overdamped pressure curve. Actual absolute temperature is irrelevant.

In waveforms C, W and H, the solid line represents a drum which is free of leaks; hence these curves reflect changes in test chamber pressure during a given time interval as a result of drum temperature, no other factor being operative. But if the drum is leaky, this will show up in time, as indicated by the dashed line in each curve, by a rise in pressure above the amplitude level produced in the absence of a leak.

Thus in the system in accordance with the invention, in order to minimize the data required we need to know whether the drum under test is cold, warm or hot, so that one can predict where the curve will be at some finite point in time. Thus at time point $t_x$ in curves C, W and H, the pressure level $\Delta P$ in each curve reflects the thermal error pressure value regardless of whether the drum under test is leaky or sound, but beyond this point in time, the pressure level $\Delta P$ also depends on leakage.

Figure 6:
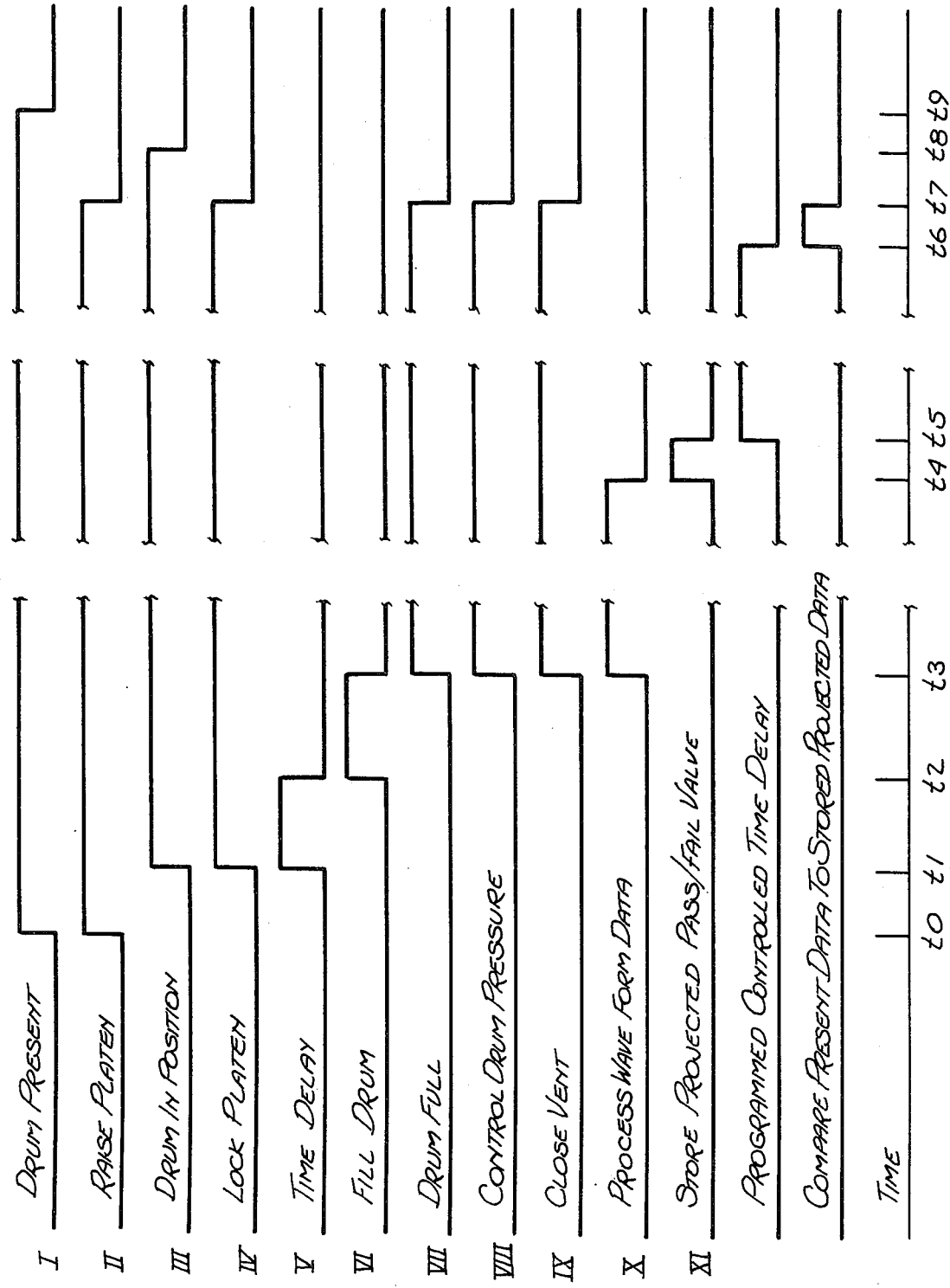
FIG. 6 is a functional timing diagram of the system.

Referring now to FIG. 6, it will be seen from the timing diagram that the leak detection system undergoes a sequence of operations before wave scanning takes place. The time scale is from $t_0$ to $t_9$. At time $t_0$, drum 18 under test (FIG. 1) is detected as being present in test chamber 19 as indicated in line I, and movement of the platen 17 toward the chamber is initiated, as indicated in line II.

Shortly thereafter at time $t_1$, the drum is in its test position within the chamber, as indicated in line III, and the platen is locked in place, as indicated in line IV. Also at this point, a time delay is initiated, as indicated in line V, to exclude the spurious effects of vibrations and audio noise from the test procedure.

At the conclusion of the time delay period at time $t_2$, the drum is filled during an interval extending to time $t_3$, as indicated in line VI, the drum being filed by means of the high volume stage in the dual-stage loop fill assembly 11. During this interval, the chamber is vented to the atmosphere by means of remotely-controlled vent valves (not shown) so that the pressure then in the chamber is the prevailing atmospheric pressure. At point $t_3$, the end of the fill period, the fact that the drum is full is detected, as indicated at line VII, and the automatic regulation of internal drum pressure by the low volume stage of the fill assembly is initiated, as indicated at line VIII whereby the pressurized drum is prevented from breathing while the test for leaks is being conducted. When the full drum pressure attains its prescribed level, the chamber vents are closed at point $t_3$ as indicated at line IX, thereby hermetically sealing the test chamber. Thus at point $t_3$, assuming that up to this point the system has functioned properly to pressurize the drum under test, the drum is now ready for testing.

Testing takes place from points of time $t_3$ to $t_6$. If the pressure in the test chamber exceeds the normal operating range of the differential pressure transmitter 41, the drum is summarily rejected as a large leaker, but if the pressure in the test chamber is within the normal range of this transmitter, waveform analysis takes place within the period $t_3$ to $t_4$, as indicated by line X.

Figure 5:
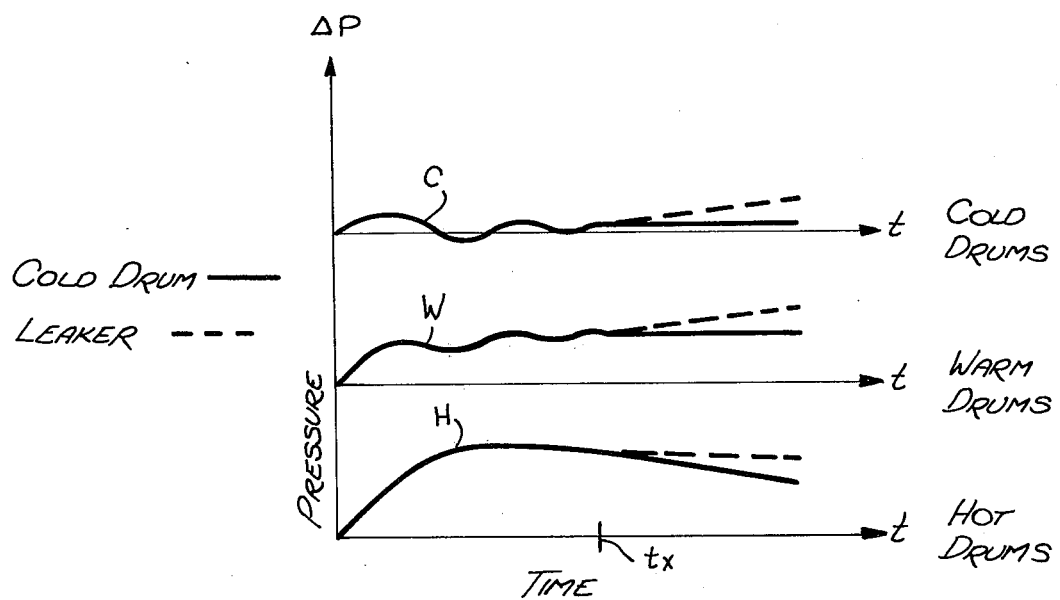
FIG. 5 are curves graphically illustrating the relationship between pressure and time for drums which are cold, warm and hot.

From the waveforms in FIG. 5, it is evident that cold drums exhibit a critically-damped characteristic with a very low amplitude, that warm drums also have a critically damped characteristic but with a higher amplitude, and that hot drums have an over-damped characteristic with a still higher amplitude. The characteristic waveforms for the thermal spectrum are stored in the computer memory of the data processor. Hence in scanning the waveforms of the drum under test, one first looks for amplitude. If in a predetermined time interval the pressure rise in the test chamber had not attained a minimum amplitude, one can assume that the drum falls into the cold category.

The shape and amplitude of the curve derived from the drum under test up to point $t_4$ is stored during the period extending between time points $t_4$ and $t_5$, as indicated by line XI. After a process-controlled time delay extending between points $t_5$ and $t_6$, as indicated by line XII, the stored curve is compared with the characteristic data for the temperature spectrum stored in the computer memory. This comparison takes place in the interval between time points $t_6$ and $t_7$. Based on this comparison, a projected pass/fail value is predicted and compared with the actual value obtained at time point $t_6$. If the pressure P in the test chamber at time $t_6$ exceeds the predicted value for the drum, the drum is rejected as a leaker; and if it does not exceed this value, it is accepted as a good drum. At point $t_7$ the platen is unlocked to lower the drum out of the chamber, at point $t_8$ the drum is no longer in position in the chamber and at point $t_9$ the drum is returned to the line.

The flow diagram in FIG. 7 summarizes the test techniques in accordance with the invention. The test starts a time $t_3$. Step 1 is the test for a large leak from time $t_3$ to $t_6$. If the sensed pressure P in the test chamber is equal to or exceeds the check pressure level $P_2$ for a large leak, then the drum is summarily rejected; but if it is less than level $P_2$, then in step 2, which is the test for a cold drum, pressure P is compared to pressure level $P_c$ for a cold drum. If the pressure P is not greater than cold drum level $P_c$, then a cold drum waveform comparison is made.

But if the pressure P is greater than cold drum level $P_c$, then in step 3, one tests for a warm or a hot drum. If the pressure curve being examined is not critically damped, this is indicative of a hot drum, so that in this step one does a hot drum waveform comparison. But if the pressure curve is critically damped, this is indicative of a warm drum, so that a step 4 waveform comparison for a warm drum is effected.

In step 5, the result of the cold drum waveform comparison (step 2), or of the hot drum waveform comparison (step 3), or of the warm drum waveform comparison (step 4), which result constitutes the projected pressure $P_p$ for pass/fail (corrected for temperature) is compared at step 6 with the stored data, and if P is less than $P_p$, the drum is passed through, and if greater, it is failed.

While there has been shown and described preferred embodiments of a dry-testing system for detecting leaks in containers in accordance with the invention, it will be appreciated that many changes and modifications may be made therein without, however, departing from the essential spirit thereof.

I claim:

1. A leak detection system for dry-testing containers having at least one bung hole or other closable opening, said system acting to determine whether the container is sound or leaky regardless of the temperature of the container at the time it is being tested, said system comprising:
   A. a chamber adapted to receive a container to be tested, said chamber being hermetically sealed during a predetermined test period;
   B. a retractable head disposed within said chamber and adapted to sealably engage the bung hole, said head having a flow passage therein communicating with the interior of the container;
   C. an external fill assembly coupled to the flow passage of the head to fill the container engaged thereby with pressurized air and to regulate the internal pressure within the chamber to prevent physical distortion of the container during the test period, whereby the volume in the zone between the container and the chamber during the test period is stable;
   D. means to sense the pressure within said zone during the test period to produce a test signal having a waveform whose amplitude changes with time and is a function of two variables, the first being pressure changes resulting from the temperature of the container held therein, and the second being pressure changes resulting from the flow of pressurized air from the container into the zone, should the container be leaky; and
   E. a data processor responsive to the waveform of said test signal, said processor including means to discount the first variable and to produce an output indicative of the second variable and independent of the temperature of the container.

2. A system as set forth in claim 1, wherein said processor includes means to scan the waveform of said signal and to compare it with nominal waveforms for different temperature conditions to determine the existence of a leak.

3. A system as set forth in claim 1, further including means responsive to said processor output to accept or reject the container after it is withdrawn from the chamber.

4. A system as set forth in claim 1, wherein said container to be tested is supported on a retractable platen which encloses said chamber during the test period.

5. A system as set forth in claim 4, further including means to vent said zone prior to said test period.

6. A system as set forth in claim 1, wherein said chamber includes two bung holes, and said head is formed by two sections, one for each bung hole.

7. A system as set forth in claim 1, wherein said fill assembly is provided with a first stage acting to carry out high-volume fill operation at a rapid rate, and a second stage thereafter acting to carry out low-volume fill regulation to maintain a substantially constant internal container pressure during the test period.

8. A system as set forth in claim 6, wherein the high volume stage includes a regulated air supply operating in conjunction with a receiver tank whose output is fed to the flow passage in said head.

9. A system as set forth in claim 8, wherein said low-volume stage includes a pressure sensor responsive to the pressure in the container under test to determine the point at which the low-volume stage is to be rendered operative and the high-volume stage inoperative.

10. A system as set forth in claim 9, wherein said pressure sensor is coupled to said container through a second flow passage in said head.

11. A system as set forth in claim 9, wherein said low-volume stage effects pressure regulation by means of a fluidic process controller which compares the internal pressure in the container with a set point pressure value to produce a control signal which modulates a valve feeding air from the tank into the container.

12. A system as set forth in claim 2, wherein said first variable is discounted by waveform analysis with respect to the shape and amplitude of the waveforms produced by a container for the entire thermal spectrum.

13. A system as set forth in claim 1, wherein said container is a 55-gallon drum.

14. The method of testing containers for leaks comprising the steps of:
   A. placing the container within a chamber and hermetically sealing the chamber during a test period;
   B. air pressurizing the container within the chamber and maintaining the internal pressure therein substantially constant during the test period to prevent physical distortion of the container;
   C. sensing the pressure within the zone between the container and the chamber during the test period to produce a test signal having a waveform whose amplitude changes with time and is a function both of the effect of container temperature on zone pressure and the effect of a pressure transfer from the container to the zone should a leak exist; and
   D. processing the test signal to discount the temperature effect on pressure to produce an indication which reflects only the existence of a leak.

15. The method as set forth in claim 12, wherein said processing is effected by a waveform scanning technique to distinguish between the effect of temperature and the effect of leakage on the changing amplitude of pressure with time.

16. The method as set forth in claim 13, wherein pressure within said container is maintained by comparing the internal pressure within the container with a set point value to provide an error signal serving to modulate the inflow of air into the container.

17. The method as set forth in claim 1, including the step of venting the chamber prior to the test period.

* * * * *